US006776335B1

(12) United States Patent
Carlson

(10) Patent No.: US 6,776,335 B1
(45) Date of Patent: Aug. 17, 2004

(54) ARTICLE AND METHOD FOR IDENTIFICATION, CLASSIFICATION, AND INVENTORY TRACKING

(76) Inventor: David E. Carlson, 1861 Melrose Ave., St. Louis Park, MN (US) 55426

( * ) Notice: Subject to any disclaimer, the term of this patent is extended or adjusted under 35 U.S.C. 154(b) by 436 days.

(21) Appl. No.: 09/580,853

(22) Filed: May 30, 2000

(51) Int. Cl.⁷ ................................................ G06K 17/60
(52) U.S. Cl. ........................................ 235/385; 206/418
(58) Field of Search ............................ 235/385, 462.01, 235/375; 206/418, 419, 420

(56) References Cited

U.S. PATENT DOCUMENTS

| | | | | |
|---|---|---|---|---|
| 3,787,993 A | | 1/1974 | Lyon | 40/306 |
| 3,826,222 A | | 7/1974 | Romick | 116/121 |
| 3,894,173 A | | 7/1975 | Andrews | 174/74 R |
| 4,184,592 A | | 1/1980 | Howard, Jr. | 206/327 |
| 4,613,042 A | * | 9/1986 | Aeschliman | 206/419 |
| 4,637,149 A | | 1/1987 | Rivkin | 40/2 R |
| 4,697,327 A | | 10/1987 | Adell | 29/527.4 |
| 4,858,763 A | * | 8/1989 | Scott | 206/419 |
| 4,953,701 A | * | 9/1990 | Maddock | 206/419 |
| 5,031,488 A | | 7/1991 | Zumeta | 81/180.1 |
| 5,164,575 A | * | 11/1992 | Neeley et al. | 235/385 |
| 5,542,535 A | | 8/1996 | Dalton | 206/419 |
| 5,553,708 A | * | 9/1996 | Lawrence et al. | 206/419 |
| 5,862,774 A | | 1/1999 | Moss | 116/200 |
| 6,027,141 A | | 2/2000 | Baumann, Jr. | 283/79 |

FOREIGN PATENT DOCUMENTS

| | | | | |
|---|---|---|---|---|
| JP | 2001213446 | * | 8/2001 | B65D/30/22 |

* cited by examiner

*Primary Examiner*—Daniel St.Cyr
(74) *Attorney, Agent, or Firm*—Nawrocki, Rooney, & Sivertson, P.A.

(57) ABSTRACT

The present invention relates to an article and method for identification, classification, and inventory tracking of articles in bulk. The article has a first state and a second state. The state is the condition of the article including such states as new, used, broken, or depleted. When the article is new, it will have a perception indicating its state. The perception will be different from other perceptions of the article because of an identifiable characteristic which differentiates it from articles being in other states. The article has a second perception that is representative of a second state of the article. The second perception may be fixed upon or within the article or, in the alternative, the first perception may be such that, when the article changes state, the first perception changes into the second perception. The method of the invention comprises providing at least one article having at least a first state and a second state and providing each article with a first perception indicating the first state and a second perception indicating the second state of the article.

18 Claims, 6 Drawing Sheets

ARTICLE AND METHOD FOR IDENTIFICATION, CLASSIFICATION, AND INVENTORY TRACKING

BACKGROUND OF THE INVENTION

The present invention relates generally to the field of identification, classification, and inventory tracking of articles sold or stored in bulk. In particular, the present invention relates to an article and method utilized for identifying, classifying, and tracking articles that are packaged or stored in bulk wherein the packaging is such that only one surface of the articles are viewable by the user, and where the articles are of the type having an elongate substantially cylindrical shape with a first end surface that is normally the same visually as a second end surface.

Some articles are packaged in bulk and sent to the consumer in that condition, and when the consumer receives the articles, the packaging is opened in such a way that only one surface of the articles is visible. The articles can be packaged such that the articles themselves could be visible, or alternatively, they could be packaged in boxes or cartons having a surface visible. One such example is in the field of elongated fluorescent light bulbs.

When bulbs are commercially sold, they are shipped in cartons. The cartons contain a number of bulbs and are typically opened on one end, thereby exposing the end surface of one end of each bulb. When the carton is opened, all of the visible end surfaces are identical and all of the end surfaces are unmarked. Typically, the carton is used to store the new bulbs and when the new bulbs are placed into service, old, used, or depleted bulbs are often placed into the carton until they can be properly disposed of. This method of using a single carton to store the new and old bulbs reduces the space needed to store the new and old bulbs, reduces the risk of breakage, and reduces the amount of handling required to place the bulbs in a second carton.

The problem for the user, is that the new and old bulbs look alike when viewed from their end surfaces. Therefore, the user must at least partially remove bulbs from the carton in order to identify whether any particular bulb is a new or old one. This process takes time and increases the risk of damaging the bulbs. For individual applications each time a bulb is changed, the process must be repeated. In commercial applications, where large numbers of bulbs are changed, when the process is repeated for each bulb over the course of a day, the time spent becomes significantly more tangible.

Furthermore, as the carton becomes filled with old, used, or depleted bulbs, the task of finding a new bulb becomes increasingly difficult because the ratio of new bulbs to old bulbs becomes smaller. Other systems have been attempted wherein two cartons are utilized, one carton for new bulbs and one carton for old, used, or depleted bulbs. However, this system needs twice as much storage space and typically requires the user to take two cartons along during the changing of the bulbs. Furthermore, when an empty carton is used to hold the old, used, and/or depleted bulbs, there is a substantially higher risk of breakage of the bulbs because the bulbs can more readily move around within the confines of the carton.

Therefore, there is a need in the art of identification, classification, and inventory management for an article and method that enables a user, of articles shipped in bulk, to identify, classify, and track an article merely from a visible surface of the article.

The present invention addresses these needs, as well as other problems associated with the identification, classification, and inventorying of articles stored or shipped in bulk.

SUMMARY OF THE INVENTION

The present invention relates to an article and method for identification, classification, and inventory tracking of articles in bulk. Each article has a first state. The state is the condition of the article includes such states as new, used, broken, or depleted, etc. When the article is in its first state, it will have a perception that is an identifiable characteristic which differentiates it from articles being in other states. The article has a second perception that is representative of a second state of the article. The second perception may be fixed upon or within the article or, in the alternative, the first perception may be such that, when the article changes state, the first perception changes into the second perception.

The method comprises providing at least one article having a first state and a second state and providing each article with a first perception indicating the first state and a second perception indicating the second state of the article.

The above mentioned benefits and other benefits of the invention will become clear from the following description by reference to the accompanying drawings.

DESCRIPTION OF THE PREFERRED EMBODIMENT

Figure 1:
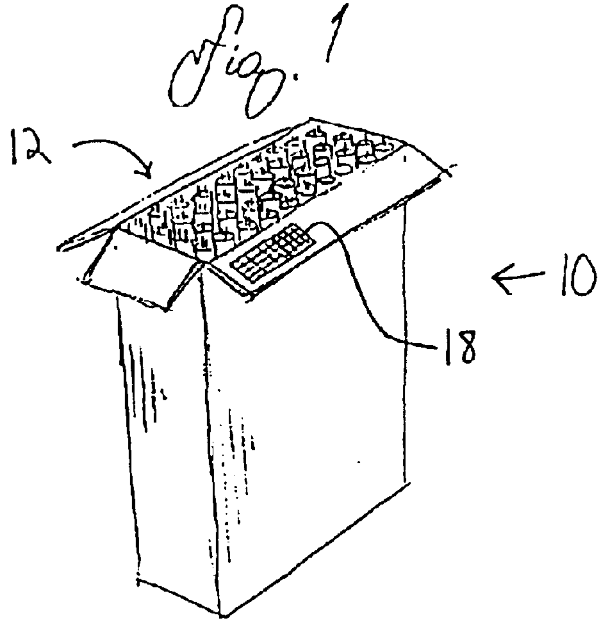
FIG. 1 is a elevated side perspective view of a carton containing bulk packaged articles upon which the present embodiment of the invention may be used.
Figure 2:
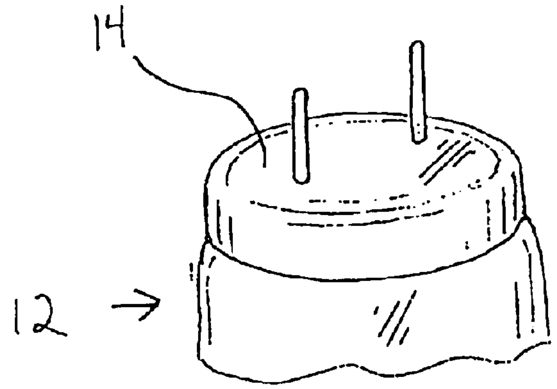
FIG. 2 is an elevated side perspective view of a typical unmarked article.
Figure 2A:
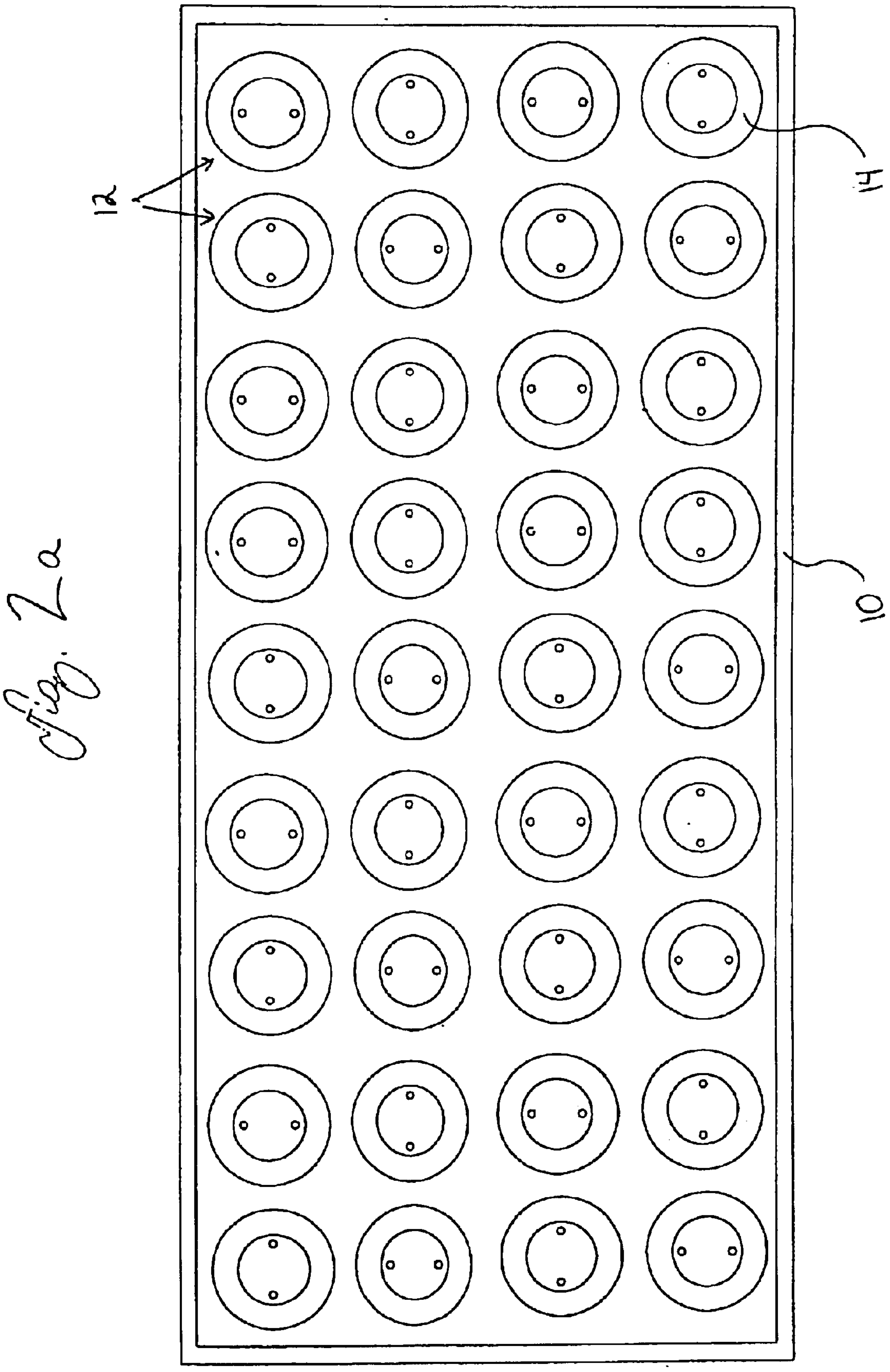
FIG. 2*a* is an overhead perspective view of a carton of bulk packaged articles as shown in FIG. 1.

As shown in FIGS. 1 and 2, a package 10 of bulk articles 12 can be difficult to use if the articles are not marked to differentiate the different types of articles that exist within the package. For example, elongated flourescent light bulbs typically have no markings on their end surfaces 14, as shown in FIGS. 2 and 2*a*. Since the end surfaces 14 are exactly the same, there is no way to differentiate, for example, the used bulbs from the new bulbs, or to differentiate between different types of bulbs within the same package. The user must at least partially remove the article from the packaging or storage carton in order to identify what the status of the article is.

The present invention provides an article and method for identifying the different articles stored together or shipped within the same package without having to remove the articles from the package. The article and method will make finding a particular article from a bulk supply of articles more time efficient, requires less handling, and requires less storage space because no additional cartons, packaging or containers are needed. Furthermore, by not having to remove the articles from the packaging to identify them or having to collect or store the articles in a separate container, the risk of damage to the articles is reduced, and the conservation of handling and space are achieved.

Figure 3:
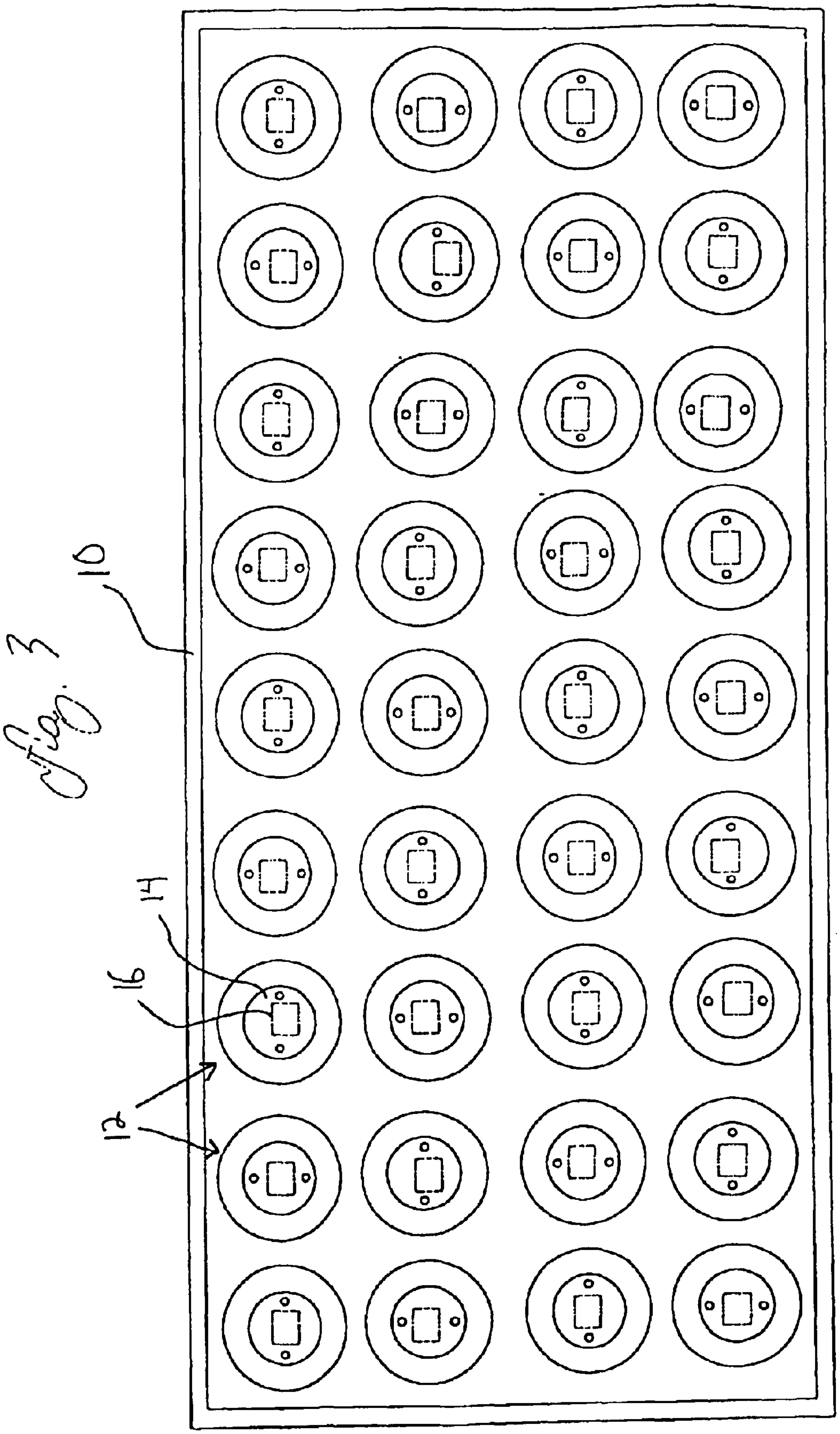
FIG. 3 is an overhead perspective view of a carton and bulk packaged articles having a first perception according to the present invention.
Figure 4:
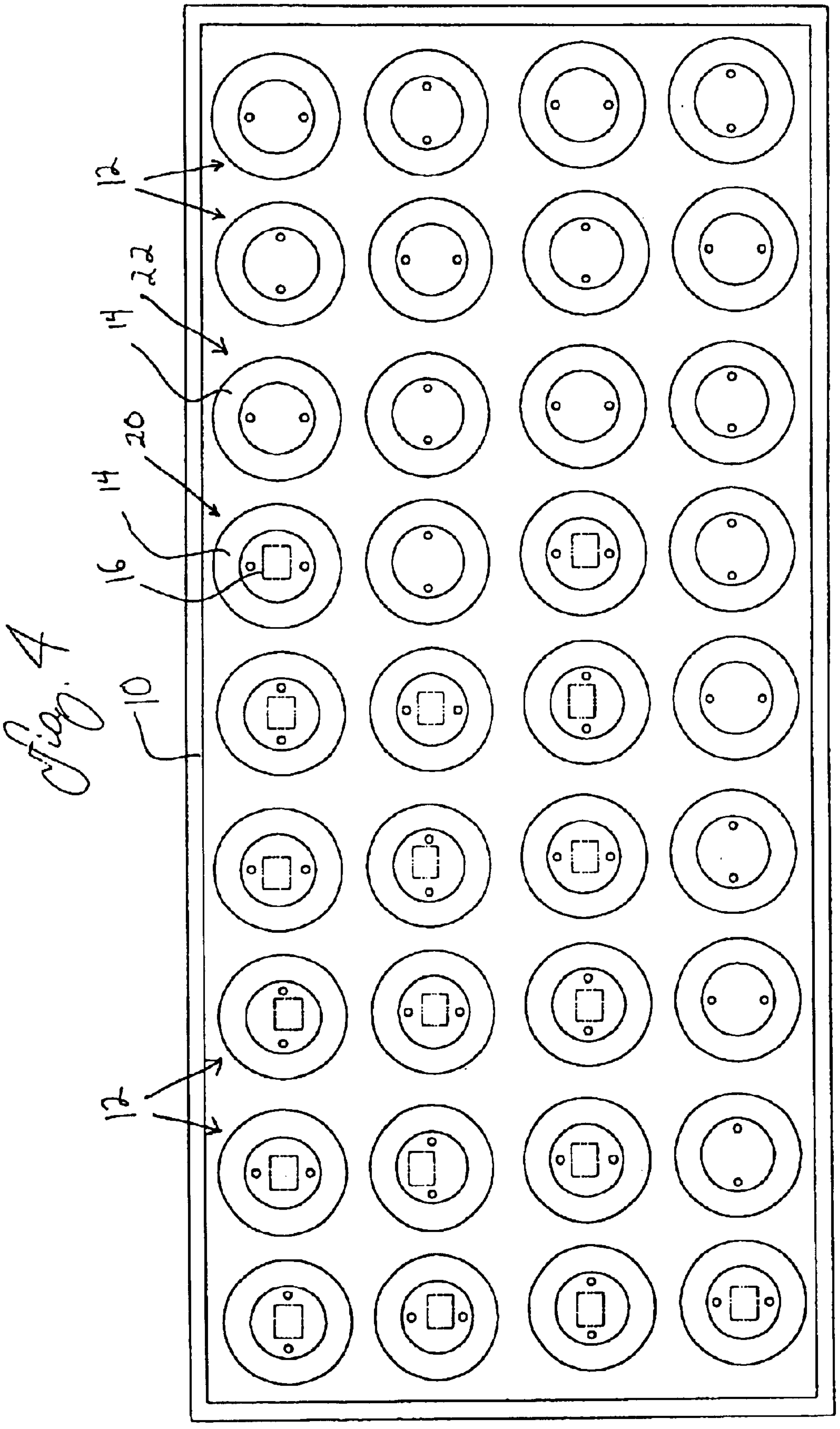
FIG. 4 is an overhead perspective view of the articles wherein some articles have been removed and replaced showing a second perception.
Figure 5:
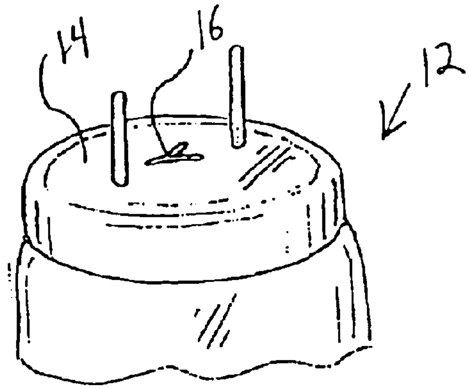
FIG. 5 is an elevated side perspective view of an alternative style of marking according to the present invention.
Figure 6:
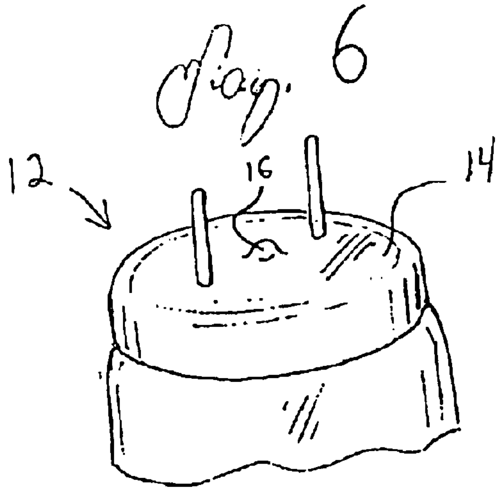
FIG. 6 is an elevated side perspective view of another alternative style of marking according to the present invention.

FIGS. 3 and 4 provide a pictorial example of how the method accomplishes its goal of providing identification, classification, and inventory tracking. As shown in FIG. 3, the articles 12 may be packaged with at least one surface 14, having an identifiable characteristic 16 thereon and having the surfaces 14 of the articles 12 bearing the characteristic 16, oriented along one side of the packaging 10.

In the case where the marks 16 are already on the articles, when the packaging is opened from the side on which the marks have been aligned, the surfaces 14 having an identifiable characteristic 16 are visible. It is foreseeable that all of the surfaces of the article may have different identifiable characteristics, however, for the purposes of this invention, only one surface need be marked with a characteristic that is identifiable from those of the other surfaces. For example, an article may be packaged in a box. One side of the box may have red markings on it, while another side has a blue background color. These two indicators could be used to differentiate new from used, if the articles were oriented properly.

Figure 7:
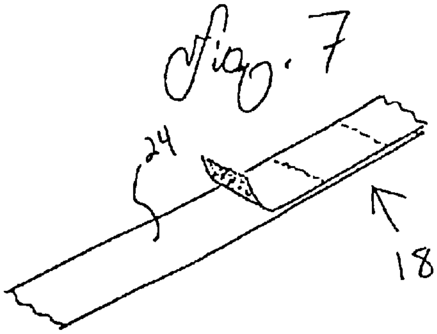
FIG. 7 is an elevated side perspective view of one means of marking the articles in accordance with the present invention.
Figure 8:
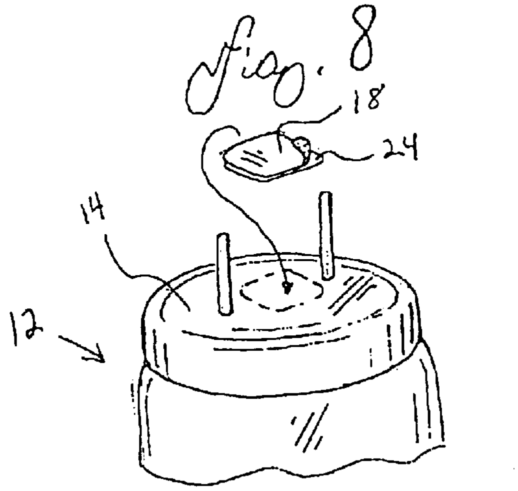
FIG. 8 is an elevated side perspective view of another alternative style of marking using a label being applied according to the present invention.
Figure 9:
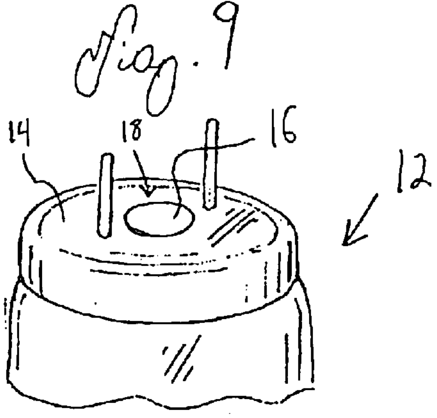
FIG. 9 is an elevated side perspective view of an article having a label applied according to the present invention.
Figure 10:
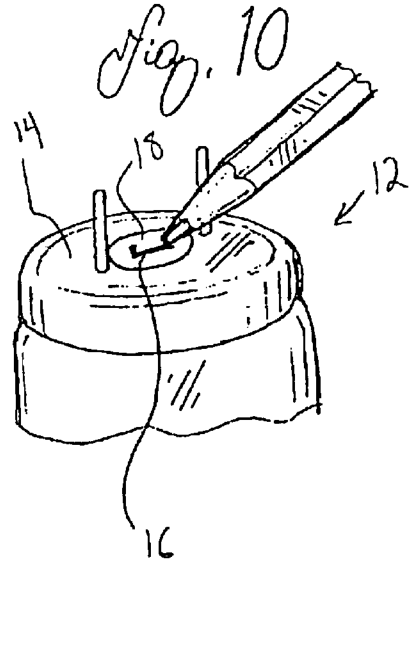
FIG. 10 is an elevated side perspective view of another alternative style of marking being applied according to the present invention.

Alternatively, the articles 12 may be packaged in an unmarked condition and the marking may be applied at a later time. For example, as shown in FIGS. 1, 7, and 8, labels 18 on backing layer 24 have been included in the carton 10 for subsequent application to the articles 12 by the user.

In the case of the flourescent bulbs shown in FIGS. 3 and 4, the bulbs 12 have one end surface marked with a square 16 and one end surface unmarked. As shown in FIG. 3, the articles 12 are all oriented such that all of the end surfaces 14, marked with a square 16, are aligned together. This orientation provides the same first perception of each article.

In this case, if the user had opened the carton 10 at the other end, the user would have seen all of the surfaces 14 having unmarked ends. Therefore, with an article that is logically only visible at either one end or the other, the method could be implemented regardless of which end of the carton was opened. It is foreseeable that the outside surface of the packaging 10 could be marked to indicate which side of the package to open to expose the surfaces 14 of the articles bearing the desired identifiable symbol.

Once the desired side of the packaging 10 is opened, the articles 12 are ready for use. Typically, in the field of flourescent bulbs, when a new bulb 20 is removed, a used bulb 22 is inserted into the package in its place. Due to the possibility of breakage of some of the articles, it is foreseeable that the package will not remain completely full.

When a used article 22 is placed into the package, it is oriented such that the second identifiable characteristic is visible. This second perception differentiates the used articles 22 from the new articles 20. As shown in FIG. 4, the used bulbs 22, having a surface with no marking visible, are easily differentiable from the new bulbs 20 having a surface with a square symbol 16 visible. In this example, the square symbols 16 act as the first identifiable characteristic providing a first perception which indicates that the state of these bulbs is new and the lack of marking acts as the second identifiable characteristic providing a second perception that is different from the first which indicates that the state of these articles is not new. As can be ascertained by FIG. 4, by using the article of this invention and this method, a user can easily tell which articles should be removed for use.

The differentiation may be made by any means known in the art and may be applied at the factory or by the user. The different characteristic may be that one surface is marked and another is not marked.

It is also foreseeable that the new articles could be differentiated from used articles using a variety of characteristics indicating a variety of different states. For example, new articles could have no marking, broken articles could have a star symbol, used but still operable articles could be represented by a "U" symbol. This system allows the user to store all articles together while still being able to easily differentiate between them.

The marking of the articles may be accomplished in many ways. The articles may have different visible surfaces having different characteristics so that when the articles, after they have been used, are reinserted into the packaging, the articles are oriented such that the different surface is visible, and it thereby distinguishes the used article from the new article.

The article may also be configured with a first identifiable characteristic that changes into a second identifiable characteristic over time or is actuated when it is used for its intended purpose. For example, in the field of flourescent bulbs, the end of the bulb may be designed with a material that changes color when electricity acts upon it. The old bulb is then able to be differentiated from the new bulbs by the changed color of its end surface. In this way, the first perception changes into the second perception when the state of the article changes.

The article may also have an indicator device attached to it that changes over time or when it is actuated through use of the article. For example, a switch or a meter may be installed on the visible surface that, when activated, will provide a visible indicator of the article's condition.

Some other examples of marking systems may be: using a symbol such as a letter, number, trademark, generic symbol or combination. For example, using the letter "N" on one surface for new and "U" on another surface for used. Another alternative identification system, may be provided by using color or shape.

A color may be used to differentiate the state of the article by coloring a portion or the entire surface. For example, using green on one surface for new and red on another surface for used.

The overall shape of the surface may be the identifiable feature. This may be achieved by altering the topography of the surface, including for example, the use of divots or bumps, or the shape of the perimeter of the surface may be different. For example, one surface may have a circular perimeter, while another surface has a hexagonal surface.

Additionally, it is foreseeable that different types of articles, having different marking schemes, could be included in a single package or may be stored together. In this case, the different types of new articles could be differentiated from each other by different first identifiable characteristics, and could be differentiated from articles having other states by either one or more second identifiable characteristics.

The articles, as shown in FIGS. 2*a* and 3, are examples of a system of marking that could be used with the present invention. FIGS. 5 and 6 and 8–10, shown individual articles 12 having a variety of different examples of identifiable characteristics 16 that may be used within the scope of this invention.

Since many possible embodiments may be made of the present invention without departing from the scope thereof, it is to be understood that all matter herein set forth or shown in the accompanying drawings is to be interpreted in the illustrative and not a limiting sense.

That which is claimed is:

1. An article for easy identification, classification, and inventory tracking, comprising a first perception and a second perception for differentiating articles of a type having an elongate substantially cylindrical shape with a first end surface that is visually similar to a second end surface, said first perception being provided by a first visible characteristic located on one said one of said end surfaces and said second perception being provided by a second visible characteristic located on the other end surface, said first visible characteristic visibly different from said second visible characteristic, said article having only one perception visible when stored in a carton with a plurality of similar articles.

2. The article according to claim 1, wherein said article has a first state as an unused article and a second state as a used article, and wherein said first characteristic identifies articles in said first state and said second characteristic identifies articles in said second state.

3. The article according to claim 1, wherein said first visible characteristic is a first color and said second visible identifiable characteristic is a second color.

4. The article according to claim 1, wherein said article is an elongated fluorescent light bulb having two ends and each said end having an end surface thereon.

5. The article according to claim 4, wherein said first perception is provided by a visible characteristic located on one of said end surfaces.

6. The article according to claim 5, wherein said first perception is provided by a first visible characteristic located on one of said end surfaces and said second perception is provided by a second visible characteristic located on said second end surface.

7. The article according to claim 1, wherein said first visible characteristic comprises a symbol.

8. A plurality of articles each of a type having an elongate substantially cylindrical shape with a first end surface that is visually similar to a second end surface, each said article having provided thereon a first perception and a second perception for differentiating said articles, said articles packaged together in a package having two ends and surrounding said plurality of articles on at least two sides, and wherein said articles are aligned such that said first identifiable characteristics are aligned adjacent to the first end of the package and said second identifiable characteristics are aligned along a second side of the package, each said article having only one identifiable characteristic visible when so packaged with a plurality of said articles.

9. The article according to claim 8, wherein the packaging enclosing said articles has an exterior surface and wherein a portion of the exterior surface that is proximal to the alignment of said first identifiable characteristics contains a marking.

10. An article of a type having an elongate substantially cylindrical shape with a first end surface that is visually similar to a second end surface and comprising a first perception and a second perception, said first perception being provided by a first identifiable characteristic located on one of said end surfaces and said second perception being provided by a second identifiable characteristic located on another of said end surfaces, said article constructed to have only one identifiable characteristic viewable when housed with a plurality of articles.

11. The article according to claim 10, wherein said first and second perceptions are incorporated into said article during manufacturing of said article.

12. The article according to claim 10, wherein said first and second perceptions are incorporated into said article after the manufacturing of said article.

13. The article according to claim 10, wherein said article further comprises a means for changing said first perception into said second perception when said article changes to a different state.

14. The article according to claim 10, wherein said article has a plurality of surfaces and wherein said first perception is provided by a distinguishing characteristic comprising a shape of one of said surfaces.

15. The article according to claim 14, wherein the shape of said one of said surfaces comprising said distinguishing characteristic is a topographical change to said surface.

16. The article according to claim 14, wherein the shape of said one of said surfaces comprising said identifiable characteristic is a topography change to the perimeter of said surface.

17. A package of bulk articles, each article of a type having an elongate substantially cylindrical shape with a first end surface that is visually similar to a second end surface and at least one side extending between the end surfaces, and having a plurality of articles arranged therein with end surfaces adjacent, said package comprising;

packaging material surrounding said plurality of articles on at least two sides and having first and second spaced-apart ends;

each said article having a first distinguishable characteristic positioned on the first said end surface of said article, and a second distinguishable characteristic positioned on the second said end surface of said article, said articles aligned such that said first characteristic of each said article is aligned along the first end of said packaging material and such that each said second characteristic is aligned along the second end of said packaging material, each said article having only one distinguishable characteristic visible when said plurality of articles is surrounded by the packaging material.

18. A group of articles, each article of a type having an elongate substantially cylindrical shape with a first end surface that is visually similar to a second end surface and having at least one side extending between the end surfaces, said first end surface having a first identifiable characteristic positioned thereon and said second end surface having a second identifiable characteristic positioned thereon and being differentiable from said first identifiable characteristic, said articles arranged having said first end viewable by a user, such that all of said first identifiable characteristics are viewable by the user, each said article constructed to have only one identifiable characteristic viewable when housed with a plurality of articles.

* * * * *